March 29, 1966     T. R. SCHMIDT     3,243,697

SELF-CONTAINED PIPELINE INSPECTING SYSTEM

Filed July 3, 1961     4 Sheets-Sheet 1

INVENTOR:
T. R. SCHMIDT
BY *Theodore E. Bieber*
HIS ATTORNEY

March 29, 1966   T. R. SCHMIDT   3,243,697
SELF-CONTAINED PIPELINE INSPECTING SYSTEM
Filed July 3, 1961   4 Sheets-Sheet 2

INVENTOR:
T.R. SCHMIDT
BY: *Theodore E. Bieber*
HIS ATTORNEY

INVENTOR:
T. R. SCHMIDT

INVENTOR:
T. R. SCHMIDT

United States Patent Office 3,243,697
Patented Mar. 29, 1966

3,243,697
SELF-CONTAINED PIPELINE INSPECTING SYSTEM
Thomas R. Schmidt, Lafayette, Calif., assignor to Shell Oil Company, New York, N.Y., a corporation of Delaware
Filed July 3, 1961, Ser. No. 121,508
3 Claims. (Cl. 324—37)

This invention pertains to pipe lines and more particularly to an instrument for the inspection of pipe lines for corrosion and other defects.

The problem of corrosion and other flaws exists in all pipe lines and particularly in pipe lines associated with the petroleum industry. In the past it has normally been the practice to wait until a leak in the pipe line manifests itself as by seepage of petroleum products at the surface or leakage of gas before corrective action was taken. Instruments are not available for periodically inspecting the pipe to determine the extent of the corrosion, and thus periodic maintenance cannot be scheduled. This results in costly delays due to shutdowns for emergency repairs.

It is, of course, possible to inspect visually a pipe line that is located on the surface. These surface pipe lines can also be inspected by various types of corrosion-detecting instruments. While it is possible to inspect pipe lines located on the surface, it is, of course, impossible to inspect pipe lines that are buried below the surface unless the inspecting instrument travels through the pipe line.

Attempts to inspect a buried pipe line in the past for corrosion and other defects have been unsatisfactory due to the inability of the systems to detect flaws and provide an accurate record that could be correlated with the pipe line. It is, of course, necessary to correlate the record obtained with the pipe line in order that the section of pipe line suspected can be uncovered and repaired. A successful instrument should be capable of inspecting a relatively long length of pipe and provide an accurate record of the flaws with suitable markers on the record to permit it to be correlated with the actual pipe line.

Accordingly, it is the principal object of this invention to provide a novel instrument that may be inserted in a pipe line to inspect the pipe line for corrosion and other defects.

A further object of this invention is to provide an improved instrument which will inspect a pipe line and provide a record showing the location and extent of corrosion and other defects while at the same time provide registering marks on the record to permit it to be correlated with the actual pipe line.

A still further object of this invention is to provide an eddy current type of instrument for magnetically inspecting the interior of a pipe line to locate corrosion and other defects and then record the extent of said corrosion and defects on a photographic record that also contains suitable marks for aligning or correlating the record with the actual pipe line.

The above objects and advantages of this invention are achieved by providing an eddy current type of instrument for magnetically inspecting the interior of a pipe line. The instrument is mounted in a suitable instrument case or probe that contains rubber pistons in order that the flow of products through the pipe line will transport the instrument through the pipe line. Phase detecting is utilized to determine the presence of corrosion or other defects with the error signals being recorded on a photographic film. In addition to recording the presence of corrosion or defects, the system also records the presence of welds between the individual pieces of pipe that are joined to form the pipe line. Also the presence of valves or other artificial marking devices are shown on the record. The presence of these marks on the record permit one to readily correlate the record with the actual pipe line and thus determine the location of the corrosion or defect.

The recording system utilized in the above system consists of a synchronous motor driving a tubular member whose outer surface is in the form of a helix. The synchronous motor is energized from the same power supply as used for energizing the exciter coil. The instant the signal from the pickup coil crosses the zero axis in a negative-to-positive direction a circuit is triggered to flash a neon light. The neon light in turn is disposed in the interior of the helical member driven by the synchronous motor with a suitable aperture being provided adjacent thereto in order that the light may shine through the aperture to expose a photographic film. The system may be adjusted so that in the absence of any defects a large portion of the light is masked by the helical element and thus a small portion of the film record is exposed. Similarly, in the presence of a major defect substantially all of the film record is exposed. Thus the system records the response of the device to every cycle of the power supply. This permits the instrument to travel much faster through the pipe line and still record the presence of rather minor defects. An isolated minor defect would appear as a large amplitude signal in the presence of a substantially zero signal.

The above objects and advantages of this invention will be more easily appreciated from the following detailed description of a preferred embodiment when taken in conjunction with the attached drawing in which.

Figure 1:
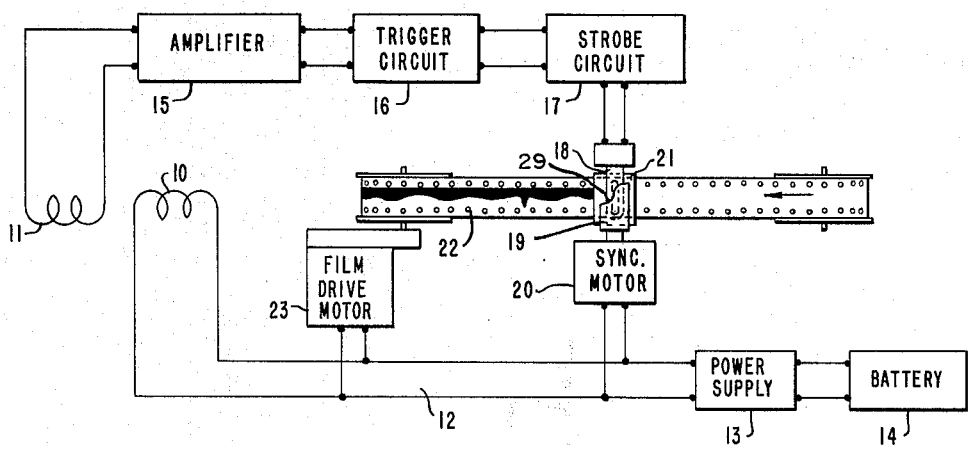
FIGURE 1 is a block diagram of a pipe line inspecting probe constructed in accordance with this invention.

Referring now to FIGURE 1, there is shown an exciter coil 10 and a pickup coil 11. The two coils should be spaced apart a sufficient distance so that the signal induced in the pickup coil 11 varies essentially exponentially with the thickness of the pipe wall. This spacing of the coils is more particularly shown in patent No. 2,573,-799. Furthermore, the pickup coil is preferably formed from two individual coils coupled in electrical opposition to improve the response of the system as described in copending application of T. R. Schmidt, entitled "Pipe Inspection Device," Serial No. 778,801, filed December 8, 1958, now patent No. 3,060,377. The exciter coil 10 is coupled by means of leads 12 to a power supply 13. The power supply is coupled to a battery source 14 and should be capable of converting the direct current battery power to alternating current power, for example 60 cycle alternating current. The pickup coil assembly 11 is coupled to an amplifier which in turn is coupled to a trigger circuit 16. The trigger circuit 16 which is more fully described below should be designed to supply a narrow-width, high amplitude pulse as the signal from the pickup coil passes through zero amplitude in a negative-to-positive direction. The narrow-width, high amplitude pulse is used to actuate a stroboscope circuit 17 to flash a neon light 18. The neon light 18 is positioned within a tubular element 19 having its edge 29 formed in the shape of a helix. The tubular element 19 is driven by a synchronous motor 20 that is coupled to the power supply 13. Positioned between the tubular element 19 and a film strip 22 is a mask 21 having a narrow slot formed therein. Film strip is moved at a relatively constant speed past the aperture of the mask 21 by a film drive motor and gear train 23. While any type of film may be used it is preferably regular movie film which provides a direct copy of the image recorded.

The above-described system operates in substantially the same manner as described in the above-mentioned patent 3,060,377 of T. R. Schmidt referred to above to detect the thickness of the metallic member surrounding the exciter and pickup coils. The thickness of the metallic member or pipeline is, of course, a measure of the extent of corrosion or the presence of other defects, for example actual holes in a pipe line would appear as merely an extremely thin section, while cracks or corrosion would appear as a thinner section but would have a considerably wider signal on the film strip. Since the tubular member 19 rotates in synchronism with the alternating field of the exciter coil the portion of the neon light that is exposed will be related to the phase of magnetic field of the exciter coil 10. The neon light in turn flashes at a predetermined point during each cycle of the pickup coil signal, for example when the pickup coil signal passes through the zero axis in the negative-to-positive direction. Thus, the portion of the neon light that is exposed when it flashes will be a direct measure of the phase relationship between the field of the exciter coil and the signal from the pickup coil. The length of the neon light exposed will of course be recorded on the film strip 22 in the form of a narrow black line whose width will depend upon the width of the aperture slot formed in the mask 21. The actual appearance of the records and an indication of what various signals actually show will be described below with relation to FIGURE 2.

Figure 2:
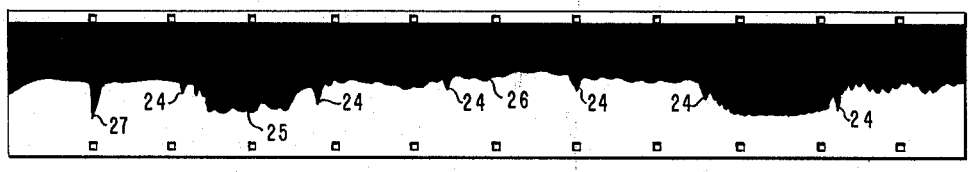
FIGURE 2 is a reproduction of a record made of the corrosion existing in a pipe line using the instrument of FIGURE 1.

Referring to FIGURE 2, there is shown a photographic record obtained when the instrument described above was run in a pipeline. The uniformly spaced marks 24 indicate the presence of welds between adjacent sections of pipe. The response 25 indicates an extensive corrosion in this section of pipe while the response 26 indicates a normal section of pipe. It can be appreciated from the record shown in FIGURE 2 that the recording system of this invention responds to each cycle of the exciting current. This permits the detection of relatively small changes in the thickness of the pipe line, for example the location of the welds are clearly seen in FIGURE 2. Of course, the recording of FIGURE 2 can be reversed so that the thinning of the pipe wall is shown by an increase in the height of the recording instead of a decrease. In FIGURE 2, a single isolated defect detected by a single cycle of the instrument will be clearly shown on the record as for example the welds shown by the signals 24 even though adjacent signals overlay it. When the recording is reversed the adjacent signals tend to overlap the defect signal and mask it completely.

The signal 27 illustrates the presence of an artificial marker on the pipe line. The construction and use of artificial markers is more fully described in the copending application of T. R. Schmidt, entitled "Pipeline Marking Device" filed June 6, 1960, Serial No. 34,290, now patent No. 3,116,452. As explained in this copending application, the shorted coils used to generate artificial markers can be arranged to provide either positive or negative signals. The signal 27 is a negative signal.

Figure 3:
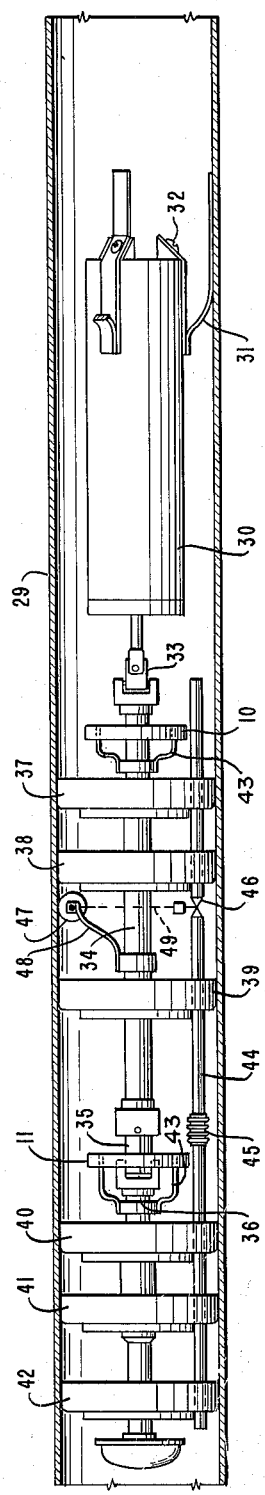
FIGURE 3 is a longitudinal section of a pipe line probe constructed in accordance with this invention positioned within a section of a pipe line.

Referring now to FIGURE 3, there is shown a longitudinal section of an actual probe constructed in accordance with this invention. The probe is shown positioned within a section 29 of a pipe line and consists of an instrument case 30 supported at one end by means of a plurality of spring members 31. The spring members 31 are circumferentially spaced around the instrument case 30 and securely fastened thereto by any desired means as for example cap screws 32. No mountings are shown for the electronic components within the instrument case 30 as such mountings are well known to those skilled in the art. It is, of course, necessary to construct the instrument case so that it is fluidtight to protect the electronic components from damage by the products flowing in the pipe line. Also the instrument case must have sufficient mechanical strength to withstand the pressures existing in the pipe line. The instrument case is coupled to a supporting link member 34 by means of a universal joint 33. The supporting link 34 in turn is coupled to a second supporting link 36 by means of a second universal joint 35. The supporting links are designed to support rubber piston members 37–42. The piston members are cup-shaped and designed to seal off the interior of the pipe line in order that the flow of the products through the pipe line will carry the instrument probe with it. The exciter coil 10 is mounted on the supporting link 34 while the pickup coil assembly 11 is mounted on the link 36. The coil assemblies are preferably mounted by means of spring members 43 to permit the coils to move to one side when encountering an obstruction in the pipe line. The spring members 43 are leaf type springs that are spaced circumferentially around the coil assemblies and firmly anchored to supporting links 34 and 35. Of course, both coil assemblies must be designed to have sufficient mechanical strength to prevent damage thereto while traveling through the pipe line as well as to maintain their approximate configuration.

In many pipe lines the products flow at a rapid rate and it is necessary to provide a means for slowing the travel of the probe if accurate records are to be obtained. This may be accomplished by providing a bypass means in the probe to bypass a portion of the product flow. A bypass is shown in FIGURE 3 and consists of a conduit 44 having a flexible portion formed by a bellows 45 adjacent the universal joint 35. The conduit 44 is provided with a motor operated flow control valve 46. The valve 46 may be either an electrical, hydraulic operated valve or mechanically operated valve. The position of the valve 46 is controlled by a roller 47 which is held in contact with wall of the pipe by a spring member 48. The roller is used to drive a speed-sensing member as, for example, a tachometer generator or hydraulic pump. The output signal from the speed sensing member is used to control the position of the valve 46. This coupling is shown schematically in FIGURE 3 by the dotted line 49.

The use of a bypass member and flow control valve permits the probe to travel at a speed below the speed of the product flow. In addition, by positioning the flow control valve by speed sensing device the probe will travel at a constant speed regardless of variation in the flow of the products through the pipe line. This is an important feature of this invention since numerous pressure surges occur in a pipe line and would cause undesirable variations in the travel of the probe.

While the valve 46 described above was positioned by a speed-sensing device, it could also be positioned by a device that senses the pressure differences between the inlet and outlet of the bypass. By maintaining a constant pressure difference across the probe one would obtain a substantially constant speed of travel of the probe.

The actual design of a probe member and the length of the various supporting links 34, 35 and 36 will be determined by the characteristics of a particular pipe line. Obviously, for a pipe line having numerous sharp bends it will be necessary to use relatively short supporting links in order that the probe may easily traverse these bends. Similarly, the overall diameter of the coil assembly 10 and 11 will be determined by the interior surface of the pipe line, for example in many of the older pipe lines a considerable amount of metal projecting down into the interior of the pipe line in the vicinity of the welded joints therein. While the rubber piston members 47–41 are easily deformed to pass these projections the coil assemblies cannot. Thus, even though the spring members 43 permit some coil movement their diameter must be reduced to avoid damage from these projections.

Figure 4:
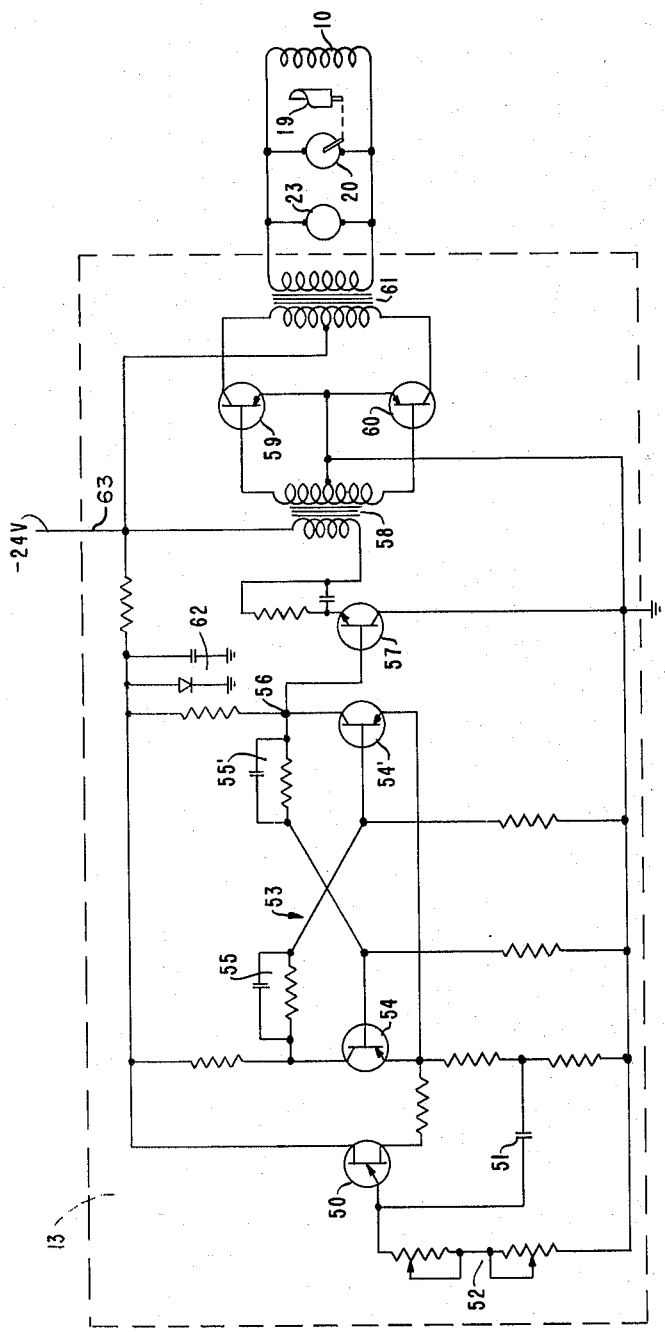
FIGURE 4 is a schematic diagram of the power supply shown in a block diagram form in FIGURE 1.

Referring now to FIGURE 4 there is shown a schematic diagram of the power supply 13 shown in a block diagram form in FIGURE 1. The power supply consists of a multivibrator stage 53 formed by two transistors 54 and 54'. The collector of the transistor 54 is coupled to the base of the transistor 54' by a parallel resistance-capacitance 55 while the collector of the transistor 54' is coupled to the base of the transistor 54 by a similar resistance-capacitance 55'. This is of course a bi-stable multivibrator circuit. The trigger pulses for the circuit 53 are supplied by a unijunction transistor 50. The unijunction transistor 50 is coupled to ground through an adjustable resistance network 52 and a capacitor 51. By adjusting the values of the resistance network 52 the frequency of oscillation of the unijunction transistor can be varied. The frequency of the unijunction transistor is preferably adjusted to 120 cycles, which will result in a square wave signal appearing at the point 56 having 60 cycles a second. The square wave is amplified in a single stage 57 and supplied through a coupling transformer 58 to two transistors 59 and 60 arranged in the push-pull circuit. The output from the two transistors 59 and 60 is coupled by a power transformer 61 to the exciter coil 10, the film drive motor and gear train 23 and the synchronous motor 20 described above with relation to FIGURE 3. A parallel diode capacitor circuit 62 is supplied between the power supply lead 63 and ground to act as a voltage regulating circuit. The diode of the circuit is preferably a Zener type diode that, after reaching a certain negative potential, will break down and pass all excess voltage directly to ground.

Figure 5:
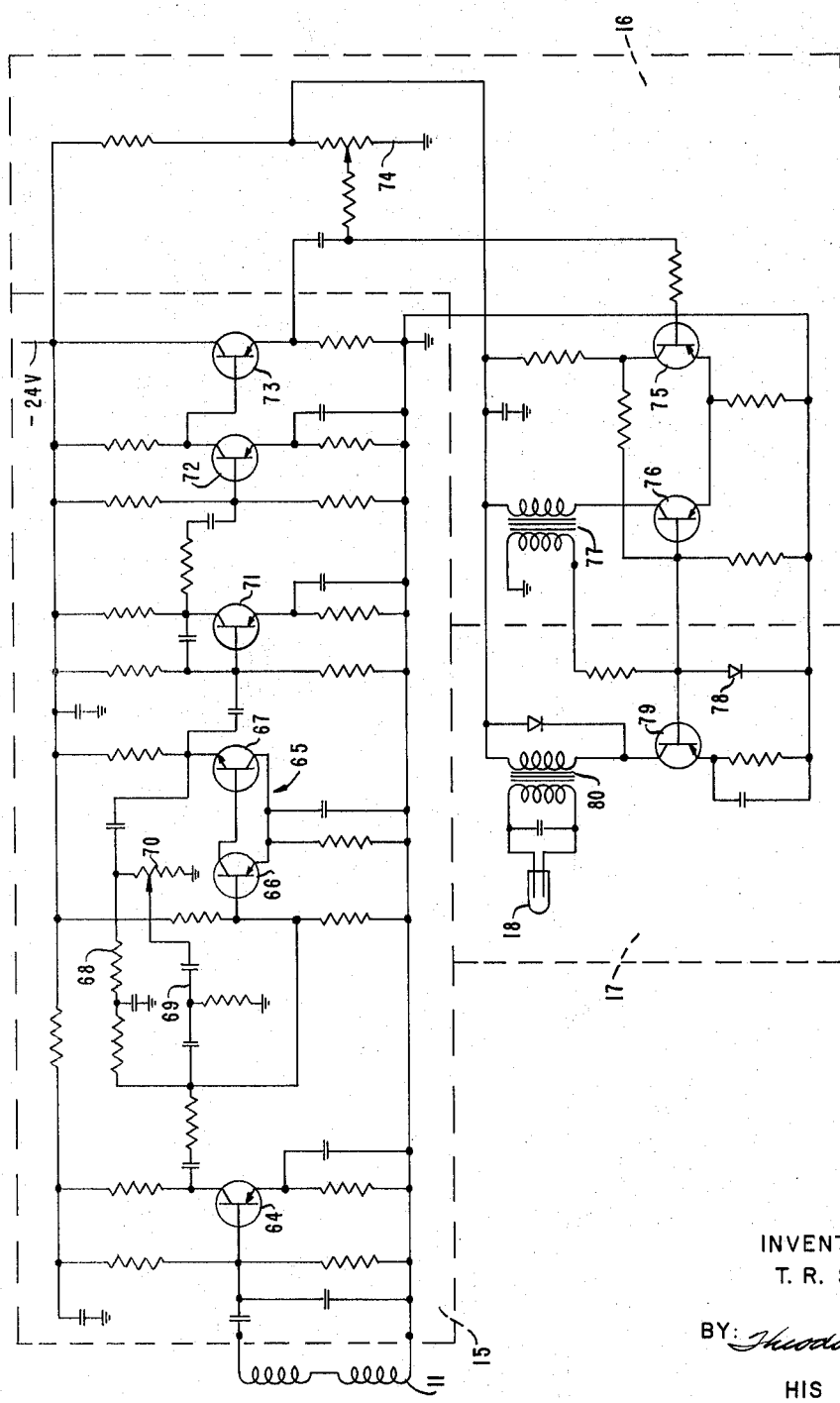
FIGURE 5 is a schematic diagram of the amplifier trigger and stroboscope circuits shown in block diagram form in FIGURE 1; and, FIGURE 6 is a block diagram of a second embodiment of this invention using tape recording.

Referring to FIGURE 5, there is shown a schematic diagram of the amplifier 15, trigger circuit 16 and stroboscope circuit 17 shown in FIGURE 1. The signal from the pickup coil assembly 11 is coupled to a single stage transistor amplifier 64. The output from the amplifier stage 64 is coupled to a tuned amplifier stage 65. The tuned amplifier stage consists of two transistors 66 and 67 with the transistor 67 being coupled to parallel negative feedback loops 68 and 69 that form a twin T feedback loop. The feedback loop 69 is coupled to the feedback loop 68 and grounded through an adjustable resistance 70. By varying the value of the resistance 70 the frequency of the signal being fed back to the input of the tuned stage 65 can be varied and thus the frequency response of the amplifier stage 65 may be adjusted. This amplifier stage is preferably adjusted to pass only 60-cycle signals and feed back to the input side all other frequencies. Thus, the amplifier stage 65 acts as a filter to remove all frequencies other than the 60-cycle signal.

The signal from the tuned amplifier stage 65 is passed through three additional stages of amplification 71, 72 and 73. The amplifier stage 73 is preferably an emitter follower stage in order that the impedance between the amplifier 15 and the trigger circuit 16 may be accurately matched. In addition, a grounded resistance 74 is provided for adjusting the amplitude level received from the amplifier 15.

One stage of the trigger circuit 16 conducts whenever the input signal exceeds a certain level while the other stage conducts at all other times. The collector of the transistor 75 is connected to the base of the transistor 76 through a resistor, while both emitters are connected through resistors to a common ground. Thus, the transistor 76 will normally conduct until the input to the transistor 75 exceeds a set level. This level is preferably set at substantially zero amplitude when the input signal is traveling in a negative-to-positive direction. When the input signal crosses the zero axis the transistor 75 will commence to conduct and extinguish the transistor 76. This will cause an essentially positive square wave form signal to appear in the primary of the coupling transformer 77. The length of this square wave signal will be determined by the period of conduction of the transistor 75. The end of this gate will indicate when the signal from the pickup coils has again passed through zero amplitude in a positive-to-negative direction.

The transformer 77, in addition to coupling the trigger circuit to the stroboscope circuit 17, will also differentiate the gate signal and provide a narrow-width positive signal at the leading edge and a narrow-width negative signal at the trailing edge. The positive signal will be passed to ground through the diode 78 while the negative signal will be used to operate the stroboscope circuit 17 consisting of a single transistor stage 79. The transistor 79 is essentially a switch which has a very short response time and is either non-conducting in the absence of a signal or conducts in the presence of a negative signal provided to its base. Thus, the narrow width negative pulse from the transformer 77 will cause transistor 79 to conduct for a brief instant to supply the required power to flash neon light 18. When the neon light flashes it will expose a portion of the film depending on the position of the helix shown in FIGURE 1. The combination of the helix and neon light that is flashed when the pickup coil signal goes positive results in the recording of the phase relationship between the signal supplied to the exciter coil 10 and the signal induced in the pickup coil assembly.

Figure 6:
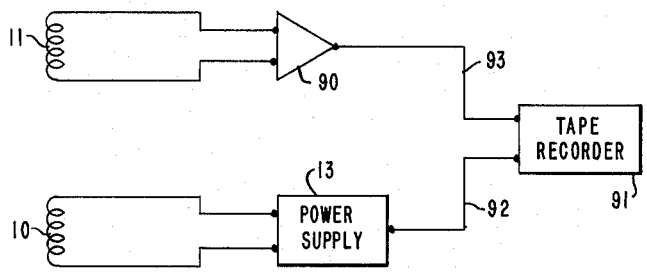

Referring to FIGURE 6, there is shown a second embodiment of this invention utilizing tape recording in place of the photographic recording of the first embodiment. The same coil arrangement and power supply as described above, is used in this embodiment. The pickup coil assembly 11 is coupled to an amplifier 90 whose output terminal is coupled to one input of a tape recorder 91 by a lead 93. The power supply is also coupled to an input of the tape recorder by a lead 92. The tape recorder is powered by the power supply 13 in a manner well known in the art. The tape recorder records both the power supply and pickup coil signals in adjacent tracks on a tape medium. In addition, the two signals should be recorded in synchronism to permit their subsequent analysis to determine the phase relationship between them.

While both the power supply and pickup coil signals were recorded in FIGURE 6, one could also record only the phase relationship between these signals. This, of course, would require a phase meter as part of the probe with the output signal of phase meter being recorded on the tape recorder.

Many additional modifications will occur to those skilled in the art within the spirit and scope of this invention. For example, amplitude detection could be used in place of the phase detecting system described above. Accordingly, this invention should not be limited to the details described above but only to its broad spirit and scope.

I claim as my invention:

1. A probe for the internal inspection of tubular members comprising: an exciter coil and a pickup coil, said coils being spaced a distance sufficient to cause the voltage induced in said pickup coil as a result of a voltage applied to said exciter coil to vary exponentially with the thickness of the wall of said tubular member; a battery-operated alternating current power supply coupled to said exciter coil; a trigger circuit coupled to said pickup coil and disposed to trigger at a predetermined point in the cycle of the signal induced in said pickup coil; said trigger circuit being coupled to a stoboscope circuit to flash a neon light whenever said trigger circuit triggers; a tubular element disposed to be rotated by a synchronous motor coupled to said power supply, the edge of said tubular element having a helical shape, the axis of the helix being coaxial with the axis of the tubular element, said neon light being disposed within said tubular element; a light sensitive recording medium disposed to be moved past said tubular element; a scanning slot disposed between said tubular element and said recording medium to mask all of said recording medium except the portion aligned with said slot.

2. A probe for the internal inspection of tubular members comprising: an exciter coil and a pickup coil, said coils being spaced a distance sufficient to cause the voltage induced in said pickup coil as a result of a voltage applied to said exciter coil to vary exponentially with the thickness of the wall of said tubular member; said exciter and pickup coils being mounted on an elongated supporting member by a resilient means; an instrument case mounted on said support member and containing a battery-operated alternating current power supply, said power supply being coupled to said exciter coil; a recording means disposed in said instrument case and having a trigger circuit coupled to said pickup coil and disposed to trigger at a predetermined point in the cycle of the signal induced in said pickup coil; said trigger circuit being coupled to a stroboscope circuit to flash a neon light whenever said trigger circuit triggers; a tubular element disposed to be rotated by a synchronous motor coupled to said power supply, the edge of said tubular element having a helical shape, the axis of the helix being coaxial with the axis of the tubular element, said neon light being disposed within said tubular element; a light sensitive recording medium disposed to be moved past said tubular element; a scanning slot disposed between said tubular element and said recording medium to mask all of said recording medium except the portion aligned with said slot.

3. A probe for the internal inspection of tubular members comprising: an exciter coil and a pickup coil, said coils being spaced a distance sufficient to cause the voltage induced in said pickup coil as a result of a voltage applied to said exciter coil to vary exponentially with the thickness of the wall of said tubular member; said exciter and pickup coils being mounted on an articulated elongated supporting member by a resilient means; an instrument case mounted on said support member and containing a battery-operated alternating current power supply coupled to said exciter coil; a trigger circuit coupled to said pickup coil and disposed to trigger at a predetermined point in the cycle of the signal induced in said pickup coil; said trigger circuit being coupled to a stroboscope circuit to flash a neon light whenever said trigger circuit triggers; a tubular element disposed to be rotated by a synchronous motor coupled to said power supply, the edge of said tubular element having a helical shape, the axis of the helix being coaxial with the axis of the tubular element, said neon light being disposed within said tubular element; a light sensitive recording medium disposed to be moved past said tubular element; a scanning slot disposed between said tubular element and said recording medium to mask all of said recording medium except the portion aligned with said slot.

References Cited by the Examiner
UNITED STATES PATENTS

| | | | |
|---|---|---|---|
| 2,230,502 | 2/1941 | Pearson | 346—101 |
| 2,455,792 | 12/1948 | Meunier | 324—34 |
| 2,573,799 | 11/1951 | MacLean | 324—37 |
| 2,892,150 | 6/1959 | Nettles et al. | 324—37 |
| 2,940,302 | 6/1960 | Scherbatskoy | 324—34 |
| 2,961,602 | 11/1960 | Bender | 324—34 |

WALTER L. CARLSON, *Primary Examiner.*

R. B. LAPIN, R. J. CORCORAN, *Assistant Examiners.*